United States Patent [19]

Nishizaki et al.

[11] 3,989,766

[45] Nov. 2, 1976

[54] EPOXY RESIN COMPOSITION

[75] Inventors: Shunichiro Nishizaki, Kobe; Hiroshi Teratani; Shoji Takagi, both of Osaka, all of Japan

[73] Assignees: Mitsubishi Denki Kabushiki Kaisha; Mitsubishi Chemical Industries Ltd., both of Tokyo, Japan

[22] Filed: Feb. 25, 1974

[21] Appl. No.: 445,582

[30] Foreign Application Priority Data

Feb. 24, 1973 Japan.................................. 48-22574

[52] U.S. Cl. ......................................... 260/830 TW
[51] Int. Cl.$^2$......................................... C08G 45/00
[58] Field of Search........ 260/47 EA, 75 EP, 348 R, 260/830 TW, 59

[56] References Cited
UNITED STATES PATENTS 3,759,866  9/1973  Rogers, Jr. et al............... 260/830 X

FOREIGN PATENTS OR APPLICATIONS 2,143,071  3/1972  Germany .............................. 260/47
1,316,379  5/1973  United Kingdom Primary Examiner—Theodore E. Pertilla
Attorney, Agent, or Firm—Oblon, Fisher, Spivak, McClelland & Maier

[57] ABSTRACT

An epoxy resin composition which comprises an epoxy resin derived from an ester of an alkadienealcohol; an epoxy resin prepared by reacting an epichlorohydrin and a bisphenol and an acid anhydride curing agent. The cured product has very high mechanical strength and cracking resistance and is useful as an electrical insulating material.

6 Claims, No Drawings

EPOXY RESIN COMPOSITION

BACKGROUND OF THE INVENTION

1. Field of the Invention

This invention relates to an epoxy resin composition, and more particularly it relates to an epoxy resin composition which is useful for preparing electrical insulating materials.

2. Description of the Prior Art

Thermosetting epoxy resins are well known and have been conventionally used as coating and molding compositions. The bisphenol A type epoxy resin compositions which contain an acid anhydride curing agent and an epoxy resin prepared by the condensation of bisphenol A and epichlorohydrin are especially useful as molding and casting compositions. In some applications, an alicyclic epoxy resin containing no aromatic ring has been used as well as an epoxy resin composition comprising a glycidyl ester and an acid anhydride curing agent.

When the cured product prepared from a bisphenol A type epoxy resin composition is used as an electric insulating material under a polluted condition, the cracking resistance (Arc resistance) of the cured product is inferior. Therefore, it is difficult to maintain the insulating property of the product for a long time.

A glycidyl ester type epoxy resin composition is usually used to cast large articles or to cast an article which fills a metal part. However, such compositions are easily cracked as a result of the rapid change in temperature to which these objects are often necessarily subjected. Also, their mechanical properties are inferior to those of the cured product prepared from a bisphenol A type epoxy resin composition.

As noted above, the conventional epoxy resin compositions have various disadvantages which make them unsatisfactory for use as an electrical insulating material under a polluted condition. Therefore, a need exists to obtain an epoxy resin composition for molding which has superior electric properties, especially excellent tracking resistance, mechanical properties and thermal resistance.

SUMMARY OF THE INVENTION

Accordingly, one object of this invention is to provide an epoxy resin composition from which a cured product having high cracking resistance and high mechanical strength is obtained.

Another object of this invention is to provide an epoxy resin composition from which a cured product having a high tracking resistance when used as an electrical insulating material under polluting conditions is obtained.

Briefly, these and other objects of the invention as hereinafter will become apparent are achieved by providing an epoxy resin composition which comprises an epoxy compound of an alkadiene ester prepared by the epoxidation of an ester of alkadienealcohol (hereinafter referred to as ADE resin) and an epoxy resin having a specific average molecular weight prepared by the condensation of bisphenol and epichlorohydrin (hereinafter referred to as Epibis resin) and an acid anhydride curing agent.

DETAILED DESCRIPTION OF THE PREFERRED EMBODIMENTS

It has now been determined that by combining two or more commercially available epoxy resins having different properties a composition is obtained with unexpected properties. It is not easy to blend two or more epoxy resins having different properties to provide suitable miscibility of the epoxy resins. Because, even though the miscibility of the epoxy resins is improved, other desirable characteristics of each of the epoxy resins are decreased. However, ADE resin can be blended with a Epibis resin with excellent miscibility and the cured product obtained by curing this epoxy resin composition has an excellent tracking resistance which is dependent upon the ratio of the two epoxy resins. Also, the combination of epoxy resins exhibits a synergistically high mechanical strength and cracking resistance.

The epoxy resin composition of this invention comprises an Epibis resin having at least two epoxy groups in one molecule and having an average molecular weight of 300–3000 and an ADE resin having at least two epoxy groups in one molecule and an acid anhydride curing agent as main components.

The typical Epibis resin used in this invention include those shown by the formula

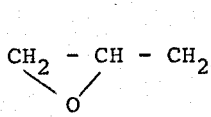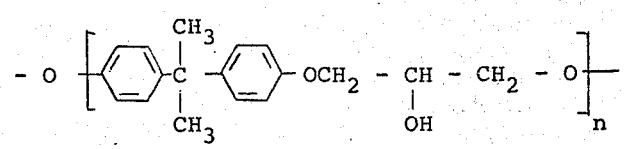

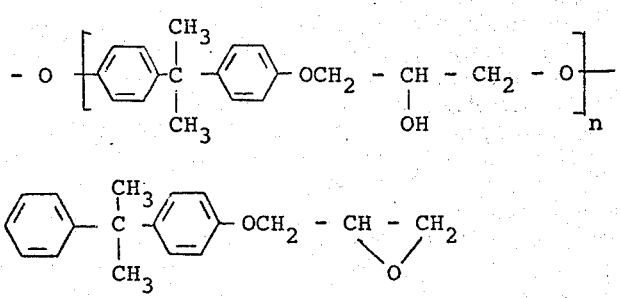

wherein $n$ is an integer of at least 1.

The epibis resin has at least two epoxy groups and has a number average molecular weight of about 300–3000, preferably about 600 – 2000 measured by the vapor pressure osmometry method. When the average molecular weight is less than 300, the synergistic effect cannot be obtained sufficiently. When the average molecular weight is higher than 3000, the miscibility with the ADE resin and a desirable viscosity cannot be provided.

The Epibis resin includes commercially available epoxy resins such as Epikote 828, 1001, 1004 and 1007 manufactured by Shell Co. (tradename); Araldite CT 200, GY-250, GY-280 manufactured by Ciba Geigy Co. (tradename); DER 331, DER 332 manufactured by Dow Chemical Co. (tradename), etc.

The ADE resin used in this invention may be prepared from an ester having the formula

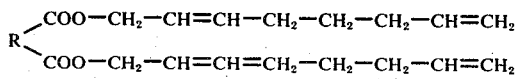

wherein R represents a moiety such as

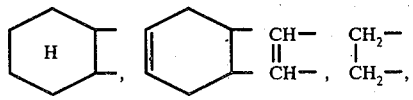

or the like; which is prepared by reacting a polyvalent aliphatic carboxylic acid or alicyclic carboxylic acid with an alkadienealcohol.

The double bonds of the ester are oxidized with hydroperoxide or acetic peroxide to convert the ester to the epoxy compound having epoxy groups. At least two epoxy groups are formed by controlling the oxidation of the double bonds of the ester. The number average molecular weight of the ADE resin may be from 100–5,000 and preferably from 100–1,000 measured by vapor pressure osmometry.

The preparation of the ADE resin and the method of curing the ADE resin are disclosed in British Pat. No. 1,316,379.

In order to further improve the tracking resistance of the cured product, it is preferable to use an alicyclic dicarboxylic acid such as tetrahydrophthalic acid, hexahydrophthalic acid or the like as the polyvalent carboxylic acid.

The acid anhydride curing agent used in this invention includes succinic anhydride, dodecenyl succinic anhydride, maleic anhydride, phthalic anhydride, hexahydrophthalic anhydride, methyl tetrahydrophthalic anhydride, methyl hexahydrophthalic anhydride, 3,6-endo-methylene-tetrahydrophthalic anhydride, methyl-3,6-endo-methylenetetrahydrophthalic anhydride, a mixture thereof, or the like.

The molding type epoxy resin composition of this invention should comprise Epibis resin (A), ADE resin (B) and the acid anhydride curing agent (C).

The ratio of said components may vary depending on the desired properties, but are usually of: A:B = 20–80 wt. parts: 80–20 wt. parts. The amount of (C) to (A) + (B) varies from 0.7–1.2 equivalent per 1 equivalent of epoxy group of (A) + (B).

When (A) is present in less than 20 wt parts and (B) is present in more than 80 wt parts, the improvement in the mechanical strength is not sufficient and the improvement in the tracking resistance and thermal deformation temperature cannot be attained.

The molecular weight of (C) is relatively low as compared to the epoxy resin so that it is difficult to define the amount as wt part. However, when the amount of (C) is outside the range of from 0.7–1.2 equivalent per 1 equivalent of the epoxy group, a suitable cured product is difficult to obtain.

A curing accelerator may be added when desired to the composition. Such accelerators include amines such as, benzyldimethylamine, dimethylaminomethylphenol, tris(dimethylaminomethyl)phenol, or the like; triethanolamine; and imidazoles such as 2-ethyl-4-ethylimidazole, 2-methylimidazole, 2-ethylimidazole or the like.

It is also possible to add a filler, a reinforcing agent, a viscosity modifier, a pigment, a dye, a plasticizer, a flow modifier and/or a flame-retardant of the like to the composition at any stage before curing. The filler, reinforcing agent and viscosity modifier can be powder such as calcium carbonate, silica, fused silica, aluminum oxide, aluminum hydroxide, talc, and clay; a fibrile such as glass chope, asbestos, or a colloid, such as, colloidal silica, bentonite or the like.

The electrical insulating material prepared by curing the epoxy resin composition of this invention has remarkably superior mechanical properties, especially superior strength, than those of the cured product prepared from a resin composition comprising only one epoxy resin. The electrical properties, especially the tracking resistance required for an electrical insulating material used under a polluting condition can be improved by the combination of the two types of epoxy resins. The electrical insulating material of this invention also has a high thermal deformation temperature and also a high cracking resistance.

The composition of the ADE resin the Epibis resin of this invention has low viscosity which is advantageous for processing in a molding process or the like. Accordingly, the present composition is easily used at relatively low temperatures and advantageously has a long pot life.

Having generally described the invention, a further understanding can be obtained by reference to the following examples which are provided for purposes of illustration only and are not to be construed as limiting of the invention unless otherwise so indicated.

The epoxy equivalent, the average molecular weight and the identification of epoxy resins used in the examples and references are shown in Table A.

The epoxy resin compositions comprise an acid anhydride curing agent, and if necessary, a curing accelerator and may be cured by heating to form an insoluble solid product. The cured product means the insoluble solid product prepared by curing the epoxy resin composition. In the examples, the epoxy resin composition of this invention is prepared by admixing the two types of epoxy resins and the acid anhydride curing agent having 0.6–1.35 equivalent per equivalent of epoxy group. When the amount of the acid anhydride curing agent is within this range, the composition having the above described combination of properties is obtained.

The following test methods were used, in the examples and references.

Tracking resistance:

An applicable range is too narrow to measure the difference in the tracking resistances of the cured products by the conventional IEC method. Accordingly, the DIP-TRACK method (referred to as the DIP method) disclosed in Zetsuenzairyo Kenkyukai Paper IM-72-10 (1972) Denki Gakukai wherein a voltage resulting in a tracking break at 25 cycles was measured.

The maximum limit of the DIP method is 3 KV. When the tracking break did not occur, it is shown as above 3KV.

The bend strength and the thermal deformation temperature were measured by the JIS k 6911 method "thermosettable resin test method". The thermal shock resistant index (cracking resistance) was measured by rapidly heating and cooling a test piece in the form of a disc of the cured product filled with a washer having a projection to test the cracking of the cured product layer.

The cooling-heating cycles shown in the following table are given and the average cycle times for producing a crack in each of the five test pieces are shown. The thermal shock resistant index test method used is disclosed in Mitsubishi Electrical Technical Bulletin "Mould insulating material" by Teratani et al 43, 12 (1969) Page 1685.

| Cycle | Cooling and heating cycles (°C) | | | | | |
|---|---|---|---|---|---|---|
| | 0 | 1 2 3 | 4 5 6 | 7 8 9 | 10 11 12 | 13 14 15 |
| high temperature | *1 | 105 | 105 | 105 | 105 | 105 |
| low temperature | 0 | −15 | −30 | | −45 | −60 |

Note:
*1 A cracking was found when the cured product was cooled to room temperature.
high temperature: the test piece was kept in a hot air recycling vessel for 30 minutes.
low temperature; the test piece was kept in a methanol-dry-ice bath for 10 minutes.

Table A

Epoxy resins

| Epoxy resins | Manufacturer | Epoxy equivalent | Average molecular weight | Classification of Chemical structure |
|---|---|---|---|---|
| Epikote 828 | Shell Co. | 190 | About 380 | |
| Epikote 1001 | " | 480 | About 900 | Condensate of bisphenol A and epichlorohydrin |
| Epikote 1004 | " | 950 | About 1400 | |
| Epikote 1007 | " | 2000 | About 2900 | |
| Epikote 1009 | " | 2900 | About 3900 | |
| Araldite CT-200 | Ciba-Geigy | 390 | About 800 | |
| ADE - a | — | 168 | About 440 | Epoxy compound prepared from ester of alkadienealcohol |
| ADE - b | — | 132 | About 450 | |
| Chisso Nox 221 | Chisso Co. | 133 | About 250 | 3,4-epoxy cyclohexylmethyl-3,1-epoxycyclohexane carboxylate |

EXAMPLE 1

An epoxy resin mixture was prepared by mixing 90–10 wt parts of Epikote 1001 and 10–90 wt parts of ADE-a resin.

The epoxy resin mixture was admixed with 1 equivalent of hexahydrophthalic anhydride (hereinafter referred to as HHPA) per equivalent of epoxy group in the total epoxy resins to prepare epoxy resin compositions (No. 1–6). The composition was poured into a mold and was heated at 90° C for 16 hours and then at 130° C for 24 hours to obtain a cured product. The characteristics of the cured product were measured by the above-described methods. The results are shown in Table 1.

EXAMPLE 2

An epoxy resin mixture was prepared by mixing 90–10 wt parts of Epikote 1001 and 10–90 wt parts of ADE-6 resin.

The epoxy resin mixture was admixed with 1 equivalent of HHPA per equivalent of epoxy group in the total epoxy resins to prepare epoxy resin compositions (No. 7–12). The epoxy resin composition was poured into a mold and was heated at 90° C for 16 hours and at 130° C for 24 hours to obtain a cured product. The characteristics of the cured product were measured as described above. The results are shown in Table 1.

REFERENCE 1

An epoxy resin mixture was prepared by mixing 80–20 wt parts of Araldite and 20–80 wt parts of Chisso Nox 211. The epoxy resin mixture was admixed with 1 equivalent of HHPA per equivalent of epoxy group in the total epoxy resin to prepare epoxy resin compositions (No. a – d).

The epoxy resin composition was poured into a mold and was heated at 90° C for 16 hours and at 130° C for 24 hours to obtain a cured product. The characteristics of the cured product were measured as before and the results are shown in Table 1.

| | No. | Ratio of components in composition and characteristics of cured product | | | | | | |
|---|---|---|---|---|---|---|---|---|
| | | Ratio of Components (wt. parts) | | | Tracking resistance (KV) | Bend strength 25° C Kg/mm$^2$ | Thermal shock resistant index | Thermal deformation temperature (° C) |
| | | Epikote 1001 | ADE-a | HHPA | | | | |
| Example 1 | 1 | 90 | 10 | | 34.3 | 2.0 | 10.6 | 1.2 | 93 |
| | 2 | 80 | 20 | | 36.9 | 2.3 | 12.0 | 3.0 | 92 |
| | 3 | 70 | 30 | | 43.4 | 2.6 | 12.5 | 4.0 | 91 |
| | 4 | 60 | 40 | | 52.6 | 2.7 | 12.6 | 4.4 | 91 |
| | 5 | 50 | 50 | | 66.8 | 2.8 | 11.8 | 3.2 | 91 |
| | 6 | 40 | 60 | | 77.3 | 2.9 | 11.3 | 1.6 | 91 |
| | | Epikote 1001 | ADE-b | HHPA | | | | |
| Example 2 | 7 | 90 | 10 | | 42.3 | 2.2 | 11.5 | 1.4 | 100 |
| | 8 | 80 | 20 | | 45.5 | 2.5 | 12.5 | 3.2 | 104 |
| | 9 | 70 | 30 | | 53.7 | 2.8 | 12.9 | 3.8 | 113 |
| | 10 | 60 | 40 | | 65.5 | 2.9 | 12.8 | 3.4 | 122 |
| | 11 | 50 | 50 | | 83.9 | >3.0 | 12.2 | 3.0 | 128 |
| | 12 | 40 | 60 | | 97.6 | >3.0 | 11.7 | 1.8 | 131 |
| | | Araldite CT-200 | Chisso Nox 221 | HHPA | | | | |
| Reference 1 | a | 80 | 20 | | 45.5 | 2.5 | 9.5 | 0.8 | 109 |
| | b | 60 | 40 | | 53.6 | 2.7 | 9.4 | 0.4 | 120 |
| | c | 40 | 60 | | 65.5 | 2.9 | 9.3 | 0.0 | 143 |

| | | | | | | |
|---|---|---|---|---|---|---|
| d | 20 | 80 | 83.5 | >3.0 | 9.0 | 0.0 | 156 |

As is clear from the results, when the ratio of the Epibis resin and the ADE resin was changed in Examples 1 and 2, the tracking resistance and the thermal deformation temperature of the cured products are changed depending upon this ratio. When the ratio is 20–80 wt parts of the Epibis resin to 80–20 wt parts of the ADE resin, the bend strength and the thermal shock resistant index of the cured products are remarkable high.

REFERENCE 1

HHPA was added to only one of the Epibis resin and the ADE resin to prepare the epoxy resin compositions (No. e–k).

The epoxy resin composition was poured into a mold and was heated at 90° C for 16 hours and at 130° C for 24 hours to obtain a cured product. The characteristics of the cured products are measured by the aforementioned methods and the results are shown in Table 3.

Table 2

Ratio of components in composition and characteristics of cured product

| | No. | Epikote 828 | Epikote 1001 | Epikote 1004 | Epikote 1007 | Epikote 1009 | ADE-b | HHPA | Tracking resistance DIP method (KV) | Thermal shock resistant index | Thermal deformation temperature (° C) |
|---|---|---|---|---|---|---|---|---|---|---|---|
| Example 3 | 13 | 50 | — | — | — | — | 50 | 95.7 | >3.0 | 1.4 | 135 |
| | 14 | — | 50 | — | — | — | 50 | 50.3 | 2.8 | 3.4 | 118 |
| | 15 | — | — | 50 | — | — | 50 | 28.5 | 2.6 | 3.4 | 102 |
| | 16 | — | — | — | 50 | — | 50 | 14.5 | 2.5 | 3.2 | 81 |
| | 17 | — | — | — | — | 50 | 50 | 10.2 | — | — | — |

Table 3

Ratio of components in composition and characteristics of cured product

| | No. | Epikote 828 | Epikote 1001 | Epikote 1004 | ADE-a | ADE-b | HHPA | MNA | Tracking resistance DIP method (KV) | Thermal shock resistant index | Thermal deformation temperature (° C) |
|---|---|---|---|---|---|---|---|---|---|---|---|
| Reference 2 | e | 100 | — | — | — | — | 81.2 | — | 2.9 | 0.6 | 125 |
| | f | — | 100 | — | — | — | 32.1 | — | 1.7 | 1.0 | 95 |
| | g | — | 100 | — | — | — | — | 37.1 | 1.4 | 0.6 | 104 |
| | h | — | — | 100 | — | — | 16.2 | — | 1.5 | 3.0 | 78 |
| | i | — | — | — | 100 | — | 91.7 | — | >3.0 | 1.4 | 91 |
| | j | — | — | — | — | 100 | 116.7 | — | >3.0 | 0.0 | 142 |
| | k | — | — | — | — | 100 | — | 134.9 | 2.8 | 0.0 | 154 |

EXAMPLE 3

An epoxy resin mixture was prepared by mixing 50 wt parts of ADE-b and 50 wt parts of an Epibis resin having various average molecular weight as shown in Table 2.

The epoxy resin mixture was admixed with 1 equivalent of HHPA per equivalent of epoxy group in the total epoxy resins to prepare epoxy resin compositions (No. 13–17). The epoxy resin composition was poured into a mold and was heated at 90° C for 16 hours and at 130° C for 24 hours to obtain a cured product. The characteristics of the cured product were measured by the aforementioned methods. The results are shown in Table 2.

When the Epikote 1009 having the average molecular weight of 3900, was used the miscibility of Epikote 1009 with the ADE resin was inferior so that the composition was not suitable for molding and casting. The molding operation was easier when the Epibis resin having a lower molecular weight was used.

EXAMPLE 4

An epoxy resin mixture was prepared by mixing 50 wt parts of Epikote 1007 and 50 wt parts of ADE-b. The epoxy resin mixture was admixed with 0.6–1.35 equivalent of HHPA per equivalent of epoxy group in the total epoxy resin to prepare epoxy resin compositions (No. 18–23). The epoxy resin composition was poured into a mold and was heated at 90° C for 16 hours and at 130° C for 24 hours to obtain a cured product. The characteristics of the cured product were measured and the results are shown in Table 4.

Table 4

| | No. | Ratio of components (wt. parts) Epikote 1007 | ADE-b | HHPA * | Tracking resistance DIP method (KV) | Thermal shock resistant index | Thermal deformation temperature (° C) |
|---|---|---|---|---|---|---|---|
| Example 4 | 18 | 50 | 50 | 8.7(0.60) | 2.0 | 6.0 | 57 |
| | 19 | 50 | 50 | 10.8(0.75) | 2.3 | 3.6 | 73 |
| | 20 | 50 | 50 | 13.1(0.90) | 2.5 | 3.4 | 80 |
| | 21 | 50 | 50 | 15.2(1.05) | 2.7 | 3.0 | 83 |
| | 22 | 50 | 50 | 17.3(1.20) | 2.8 | 2.2 | 82 |
| | 28 | 50 | 50 | 19.5(1.35) | >3.0 | 0.0 | — |

* the equivalent of HHPA per 1 equivalent of epoxy group of total epoxy resins is shown in ( ).

When 0.6 equivalent of HHPA per equivalent of epoxy group was added, the thermal shock resistant index of the cured product was improved but the thermal deformation temperature was low and cracking was found in the test piece.

EXAMPLE 5

In order to study the effect of a curing accelerator for the epoxy resin composition, the cured products were prepared with and without the curing accelerator.

An epoxy resin mixture was prepared by mixing 50 wt parts of Epikote 828 and 50 wt parts of ADE-$b$.

The epoxy resin mixture was admixed with 0.9 equivalent of HHPA per equivalent of epoxy group in the total epoxy resins and a specific amount of the curing accelerator (BDMA) to prepare epoxy resin compositions (No. 24–26) as shown in Table 5.

The epoxy resin composition was poured in mold and was heated at 100° C for 3 hours and at 150° C for 4 hours to obtain a cured product. The characteristics of the cured product were measured and the results are shown in Table 5.

Table 5

| | No. | Epikote | ADE-b | HHPA | BDMA | DMP-30 | Tracking resistance DIP method (KV) | Thermal shock resistant index | Thermal deformation temperature (° C) |
|---|---|---|---|---|---|---|---|---|---|
| Example 5 | 24 | 50 | 50 | 86.1 | — | — | >3.0 | 0.2 | 90 |
| | 25 | 50 | 50 | 86.1 | 0.5 | — | >3.0 | 1.2 | 136 |
| | 26 | 50 | 50 | 86.1 | — | 0.5 | >3.0 | 1.2 | 138 |

When the epoxy resin composition not containing a curing accelerator was cured for a short time, the curing reaction was performed slowly and an incomplete cured product was obtained. However, when the curing accelerator was added, a sufficiently cured product was obtained.

EXAMPLE 6

An epoxy resin mixture was prepared by mixing 50 wt parts of Epikote 1001 and 50 wt parts of ADE-$b$. The epoxy resin mixture was admixed with 1 equivalent of one of the acid anhydride curing agents shown in Table 6 per equivalent of epoxy group in the total epoxy resins to prepare epoxy resin compositions (No. 27–29). The curing agents used were as follows: 3,6-endomethylenetetrahydrophthalic anhydride (referred to as MNA); tetrahydrophthalic anhydride (referred to as THPA); and methylhexahydrophthalic anhydride (referred to as Me-HHPA).

The epoxy resin composition was poured into a mold and was heated at 90° C for 16 hours and at 130° C for 24 hours to obtain a cured product. The characteristics of the cured product were measured and the results are shown in Table 6.

Table 6

| | No. | Epikote 1001 | ADE-b | MNA | THPA | Me-HHPA | Tracking resistance DIP method (KV) | Thermal shock resistant index | Thermal deformation temperature (° C) |
|---|---|---|---|---|---|---|---|---|---|
| Example 6 | 27 | 50 | 50 | 58.2 | — | — | 2.0 | 2.6 | 132 |
| | 28 | 50 | 50 | — | 49.7 | — | 2.6 | 3.0 | 128 |
| | 29 | 50 | 50 | — | — | 54.9 | 2.8 | 3.2 | 112 |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. An epoxy resin composition which comprises:

A. an epoxy resin having a number average molecular weight of 600–2000 and having at least two epoxy groups per molecule prepared by condensing a bisphenol and an epichlorohydrin;

B. an epoxy resin derived from an ester of an alkadienealcohol and an alicyclic or aliphatic dicarboxylic acid; and C. an acid anhydride curing agent selected from the group consisting of maleic anhydrides and phthalic anhydrides wherein the ratio of epoxy resin (A) to epoxy resin (B) is 80:20 to 20:80 by weight parts.

2. The epoxy resin composition of claim 1, wherein 0.7–1.2 equivalent of said acid anhydride curing agent per equivalent of epoxy group in the total epoxy resins is added.

3. The epoxy resin composition of claim 1, wherein said epoxy resin (B) has at least two epoxy groups and is prepared by the epoxidation of an ester of an alkadienealcohol and an alicyclic dicarboxylic acid.

4. The epoxy resin composition of claim 1, wherein said acid anhydride curing agent is hexahydrophthalic anhydride, 3,6-endomethylenetetrahydrophthalic anhydride, tetrahydrophthalic anhydride or methylhexahydrophthalic anhydride.

5. The epoxy resin composition of claim 1, wherein the epoxy resin condensate of a bisphenol and epichlorohydrin has the formula

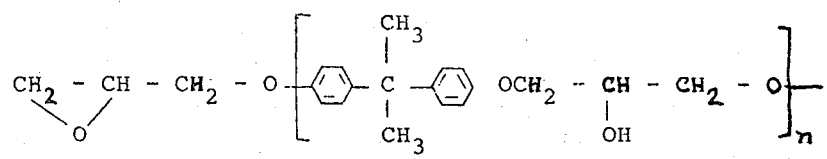

wherein n is an integer of at least 1; and the epoxy resin is derived from an ester of an alkadienealcohol having the formula

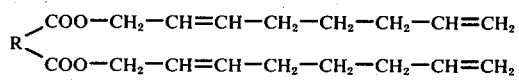

wherein R represents a moiety selected from the group consisting of

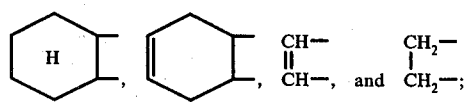

and the acid anhydride curing agent is selected from the group consisting of succinic anhydride, dodecenyl succinic anhydride, maleic anhydride, phthalic anhydride, hexahydrophthalic anhydride, methyl tetrahydrophthalic anhydride, methyl hexahydrophthalic anhydride, 3,6-endomethylenetetrahydrophthalic anhydride, methyl-3,6-endomethylenetetrahydrophthalic anhydride and mixtures thereof.

6. A cured epoxy resin product which is prepared by curing the epoxy resin composition of claim 1 by heating.

* * * * *